United States Patent
White et al.

(10) Patent No.: US 9,288,731 B1
(45) Date of Patent: Mar. 15, 2016

(54) TECHNIQUES FOR DETERMINING A HANDOFF PROFILE BETWEEN TELECOMMUNICATIONS NETWORKS

(71) Applicant: Bandwidth.com, Inc., Raleigh, NC (US)

(72) Inventors: Kyle White, Raleigh, NC (US); Jesse Stimpson, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/930,750

(22) Filed: Nov. 3, 2015

(51) Int. Cl.
*H04W 36/18* (2009.01)
*H04W 36/30* (2009.01)

(52) U.S. Cl.
CPC ............ *H04W 36/18* (2013.01); *H04W 36/30* (2013.01)

(58) Field of Classification Search
None
See application file for complete search history.

(56) References Cited

U.S. PATENT DOCUMENTS 7,801,529 B2 * 9/2010 Enzmann ............ H04W 36/24
370/331
2013/0287006 A1 * 10/2013 Nix ................ H04L 29/125
370/331
2014/0269611 A1 * 9/2014 Ionescu ............. H04W 36/0022
37/331
2015/0341831 A1 * 11/2015 Liu .................. H04W 36/00
455/436

* cited by examiner

*Primary Examiner* — Diane Lo
(74) *Attorney, Agent, or Firm* — Gregory Stephens

(57) ABSTRACT

Techniques are disclosed for evaluating an ongoing VoIP call over a combination of IP data communication network connections for purposes of determining when to hand it off to a circuit-switched cellular network connection. Multiple IP stream call quality values X1(i), X2(i), and Xb(i) are sampled over a time period (N) of (j) samples for an ongoing telephone call and stored. Instantaneous annoyance values a1(j), a2(j), and ab(j) for each of the stored call quality values for each of the IP streams within sampled time period (N) are calculated. Current accumulated annoyance values A1(i), A2(i), and Ab(i) are obtained by summing the instantaneous annoyance values a(j) for each IP network. The combined IP stream accumulated annoyance values Ab(i) is compared to a handoff threshold values Hb(i). A handoff of the telephone call a circuit-switched cellular communication link is initiated when the accumulated annoyance value Ab(i) is greater than the handoff threshold value Hb(i).

18 Claims, 9 Drawing Sheets

100

400

600

500

MOS - MEAN OPINION SCORE

| MOS | QUALITY | IMPAIRMENT |
|---|---|---|
| 5 | EXCELLENT | IMPERCEPTIBLE |
| 4 | GOOD | PERCEPTIBLE BUT NOT ANNOYING |
| 3 | FAIR | SLIGHTLY ANNOYING |
| 2 | POOR | ANNOYING |
| 1 | BAD | VERY ANNOYING |

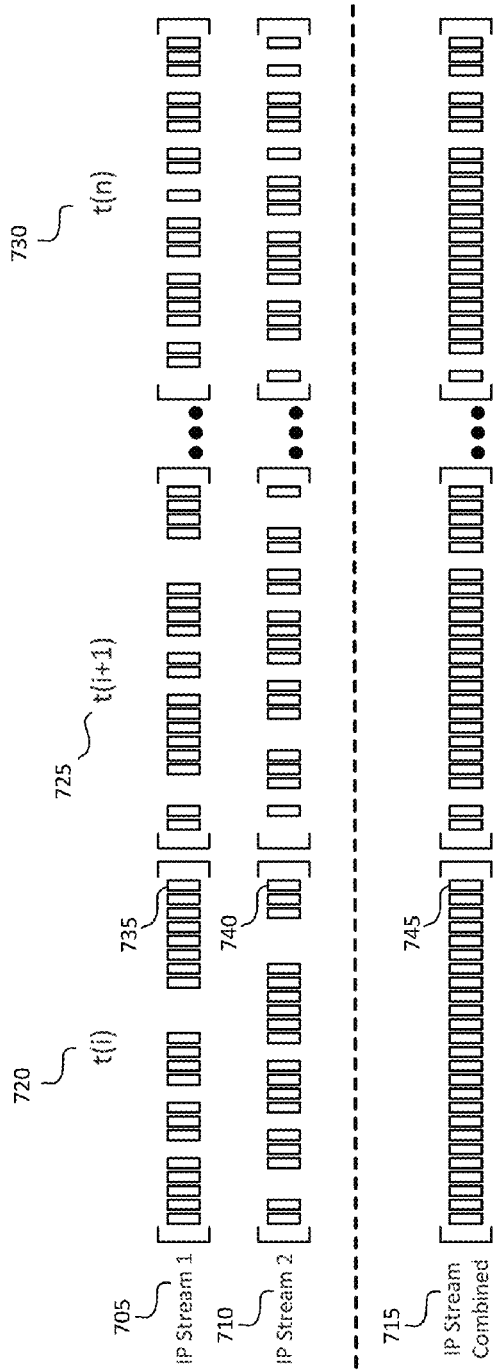
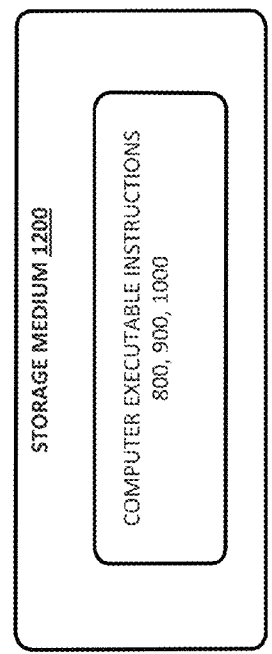

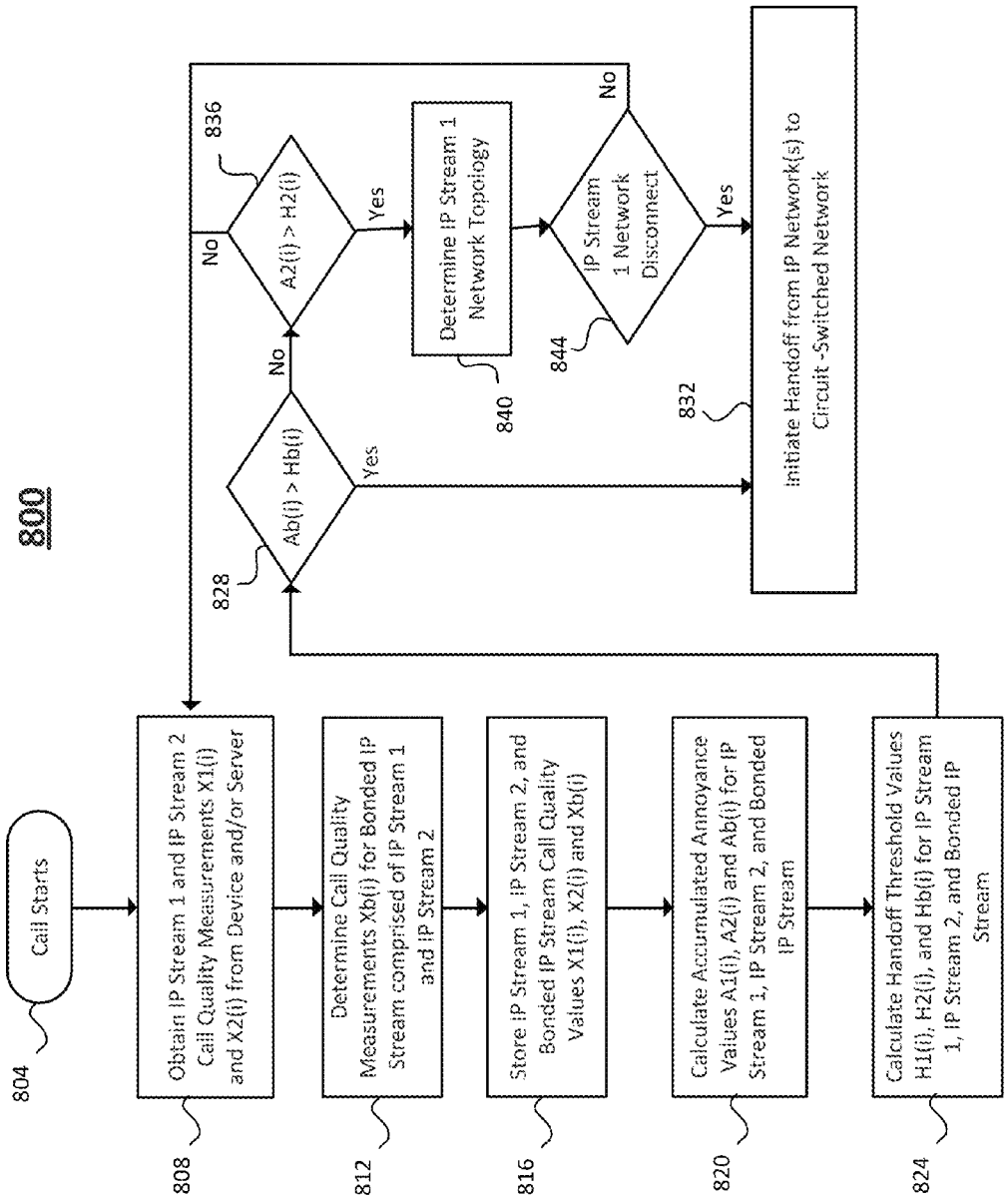

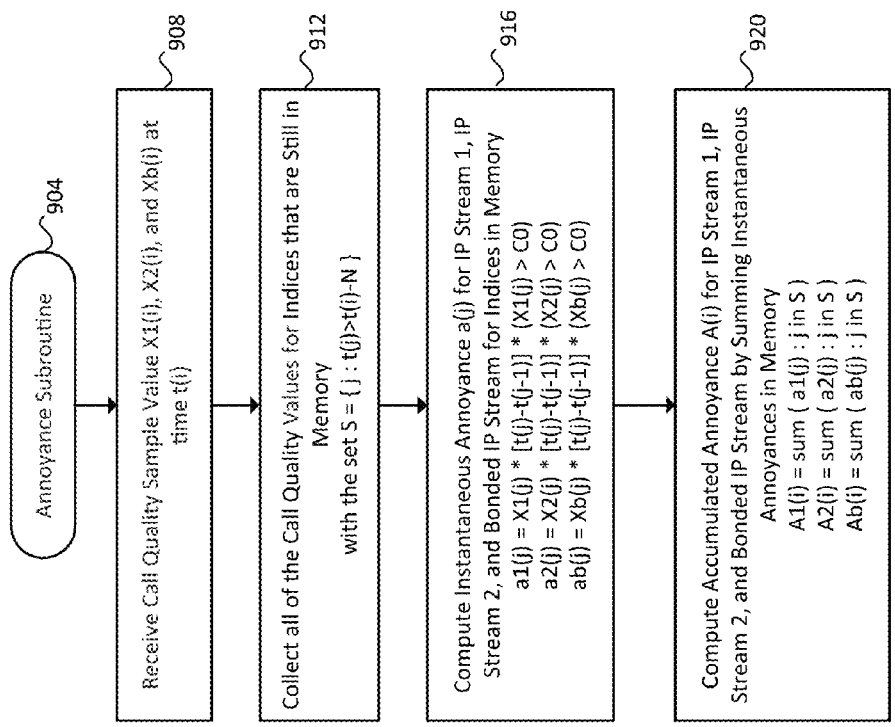

1000

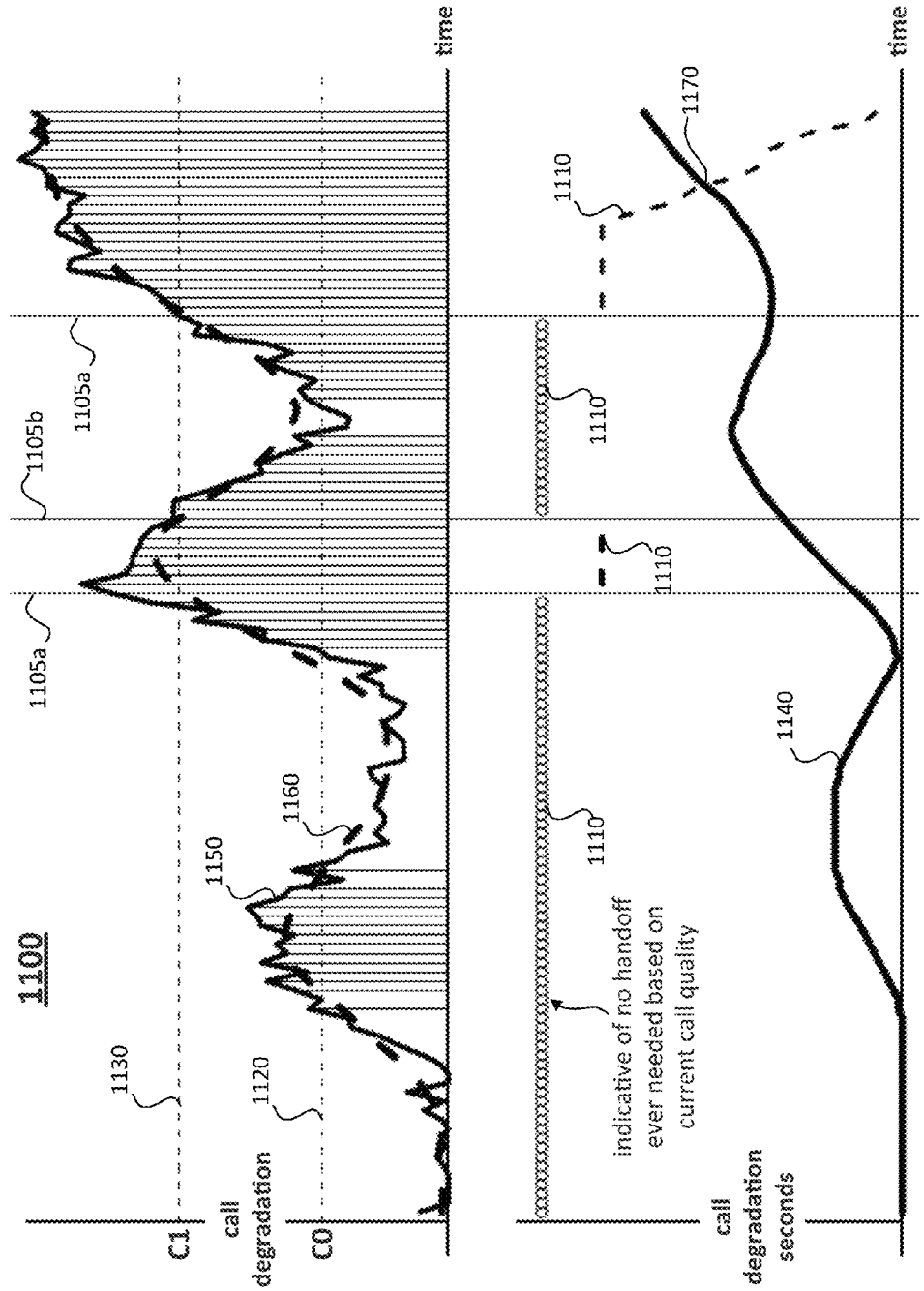

US 9,288,731 B1

TECHNIQUES FOR DETERMINING A HANDOFF PROFILE BETWEEN TELECOMMUNICATIONS NETWORKS

TECHNICAL FIELD

Examples described herein are generally related to techniques for determining a handoff profile for a dual network communication device operable on multiple telecommunications networks.

BACKGROUND

Mobile telephony devices utilizing wireless communication protocols are ubiquitous. Many of these devices utilize one of the competing cellular networks (e.g., GSM or CDMA) to place and receive telephone calls to other telephony endpoint devices. A telephony endpoint device may include another mobile telephony device on the same or another cellular network, a Voice-over-IP (VoIP) telephony device, and/or a plain old telephone service (POTS) telephony device. Each of these telephony endpoint devices may use a different access network but all are interfaced at some point to allow for communication among the different networks.

Recently, there has been introduced another type of mobile telephony device, one that is capable of utilizing multiple different networks depending on the current location or network conditions pertaining to the mobile telephony device. Such a mobile telephony device may be characterized as a hybrid mobile device due to its capability of making and receiving telephone calls on at least two distinct networks. Some hybrid mobile devices include the ability to start or establish a telephone call on one network (e.g., an IP based VoIP network over a wireless fidelity (WiFi) connection or a cellular data connection like Long Term Evolution (LTE)) and handoff the call to a second network (e.g., a circuit-switched cellular network) when conditions on the original network degrade. Rather than dropping the call, the hybrid mobile device, in conjunction with a network based server, may switch to a circuit-switched cellular connection prior to severing the VoIP connection thereby ensuring that the hybrid mobile device stays connected to the other telephony endpoint and the call is not dropped.

Determining when to initiate the handoff to avoid dropping a call can vary based on a number of factors, including but not limited to network conditions, signal strength, location and the like and is typically set based on manufacturer or carrier default settings. The aforementioned factors conspire to affect the user experience. However, network conditions may be fleeting and/or somewhat tolerable even if not perfect. Thus, users may be able to tolerate a certain degree of annoyance before wanting a call to handoff to another network. Incorporating annoyance tolerance into the handoff determination may improve the user experience. As such, described herein are methods, systems, and techniques for determining a handoff threshold based on various communication link parameters using annoyance tolerance as a triggering criteria.

BRIEF DESCRIPTION OF THE DRAWINGS

FIG. 7 illustrates an example of multiple IP streams for given time intervals.
FIG. 8 illustrates an example of a first logic flow.
FIG. 9 illustrates an example of a second logic flow.
FIG. 11 illustrates an example graph according to an embodiment of the invention.
FIG. 12 illustrates an example of a storage medium.

DETAILED DESCRIPTION

Figure 1:
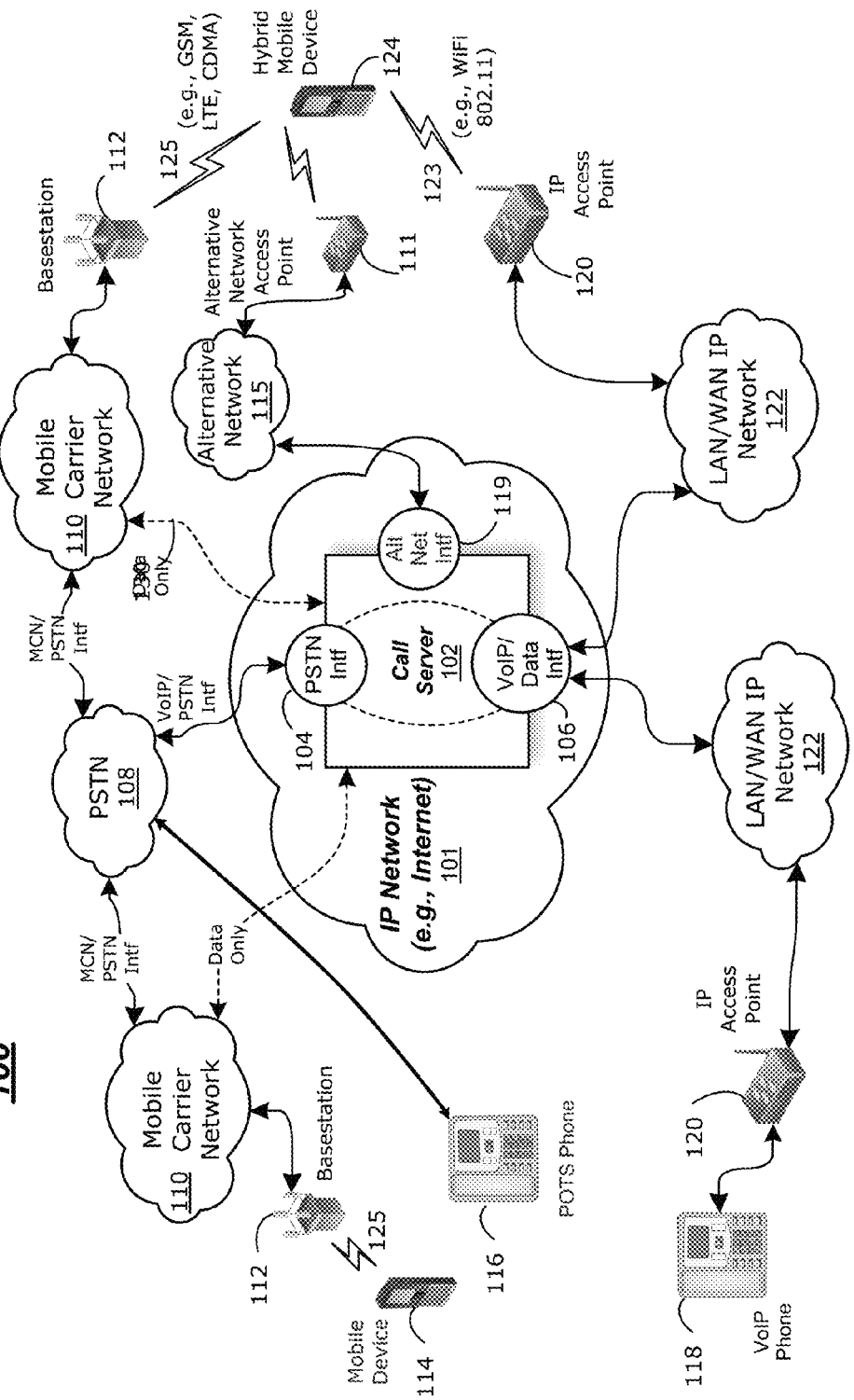
FIG. 1 illustrates an example block diagram for a networked environment.

The embodiments described herein disclose systems and methods for intelligently incorporating data based on various communication link parameters to establish a handoff profile to enhance communication sessions between or among communication devices. The systems and methods of the invention may be embodied in and performed by communication devices, call servers and other devices, and software instructions executed by some or all of such devices, as will be explained in detail below. The different types of networks contemplated herein include, for example, cellular mobile networks—both circuit-switched and IP based, and data networks, such as the Internet or other IP-based networks, including wide area networks, local area networks, and combinations thereof.

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical or logical channel that connects two or more devices. A communication link may be a signaling link or a media link. In this context, a communication session may be established via one or more communication links. One or more media streams may be transmitted over one or more communication links. A call server may be situated between communication devices thereby making the call server an endpoint in a communication link. The call server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure discusses access networks that may be characterized as the portion of a communication network that connects subscriber communication devices to a service provider's core network. An access network may also be referred to as the interface between the communication device and the network. Another type of interface may be the interface between networks. That is, the interface necessary to facilitate seamless communication from one network to another.

Therefore, references herein to a communication device capable of connecting to or communicating via a mobile carrier network refer to a communication device equipped with a cellular transceiver for wireless communication with base stations and other mobile carrier network access points for both circuit-switched communication protocols (e.g., GSM, CDMA) and IP based protocols (e.g., LTE). Similarly, references herein to a communication device capable of connecting to or communicating via a data network refer to a communication device equipped with a transceiver or other network interface for wireless communication (e.g., 802.11) with a router or other data network access point. One particular communication device may be characterized herein as a wireless handset, mobile device, or hybrid mobile device. A wireless handset may include multiple RF transceivers, one of which may be operable to connect to an access network for a mobile carrier network (e.g., cellular network) and another of which may be operable to connect to an access network for an IP data network (e.g., 802.11) or combinations thereof.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 101, one or more IP based local area networks or wide area networks (LAN/WAN) 122, mobile carrier networks 110, and the PSTN 108. While these distinct networks utilize different protocols and signaling schemes, there are various interfaces that allow for the seamless transition of voice and data (including text, audio, and video) such that various communication endpoints may communicate with one another over one or more of these inter-connected networks.

The PSTN 108 can be characterized as a circuit switched point-to-point communication network in which a physical connection between the endpoints is maintained for the duration of the connection. The PSTN 108 may also be referred to as the legacy telephone network as it is the backbone infrastructure for connecting endpoints comprised of Plain Old Telephone Service (POTS) phones 116.

Mobile carrier networks 110 (sometimes referred to as cellular networks) may come in different varieties based on a particular circuit-switched radio transmission scheme 125 between a communication device known as a wireless handset (e.g., mobile or cellular phone, or hybrid mobile device) 114 and the mobile carrier network base station 112 that is in communication with the hybrid mobile device 124. Two such circuit-switched radio transmission schemes 125 are the Global System for Mobile Communication (GSM) and Code Division Multiple Access (CDMA). These circuit-switched radio transmission schemes 125 are incompatible with one another necessitating an intervening interface to allow communication between endpoints on either network. In addition, each network may operate over a specific frequency ranges. Often, there may even be an intervening network such as the PSTN 108 between two distinct mobile carrier networks 110. Each mobile carrier network 110 includes an interface to the PSTN 108 such that calls crossing that interface can be handled by the receiving network whether it is a mobile carrier network 110 or the PSTN 108.

Various mobile carrier network operators base their network on one of the circuit-switched radio transmission schemes 125 and provide service to hybrid mobile devices 124 using that circuit-switched radio transmission scheme 125 over a defined frequency band. For example, a hybrid mobile device 124 wirelessly communicates with a base station 112 that serves as an access network to the mobile carrier network 110. The base station 112 authenticates and authorizes the hybrid mobile device 124 to the mobile carrier network 110 and, in conjunction with other equipment within the mobile carrier network 110, manages calls to and from the hybrid mobile device 124. The mobile carrier network 110 provides connectivity for any hybrid mobile devices 124 capable of cellular transmission that are physically located within range of the mobile carrier network 110. The range of a mobile carrier network 110 depends in part on an amplification, power, and/or energy associated with the antennas comprising cellular base station, hybrid mobile devices 124 and the like. As the hybrid mobile device 124 moves toward the outer range of the mobile carrier network 110, the strength of the cellular signals degrade.

The mobile carrier network 110 may also incorporate a cellular IP data RF transmission scheme 125.

Similarly, an IP based data network 122 like the Internet 101 may provide wireless connectivity to hybrid mobile devices 124 within range of an IP access point 120. For instance, an IP access point 120 may provide wireless connectivity using any of the 802.11 WiFi standards and/or any other type of IP based connectivity standard. As will be appreciated by those of skill in the art, a hybrid mobile device 124 may experience a stronger connection signal when located closer to an IP access point 120 than when located further away from the IP access point 120. Thus, the strength of the wireless data connection may fade as the hybrid mobile device 124 moves away from an IP access point 120.

There may also be one or more alternative networks 115 and alternative access points 111 that may provide access to the Internet 101 for a hybrid mobile device 124 or other wireless handset devices 114. One such alternative network 115 may be characterized as a WiMAX network operable over the 802.16 wireless protocol standard. Another such alternative network 115 may be characterized as a whitespace network. A whitespace network may utilize RF spectrum that is shared with television broadcasters. The television broadcasters do not necessarily utilize all the spectrum allocated to them to broadcast their video signals. The unused spectrum may be tapped into to provide an alternative RF access point to an alternative network 115 that can interface with the Internet 101.

The collection of IP based data networks and any IP cellular data based networks illustrated in FIG. 1 such as LAN/WANs 122, the IP data portion of mobile carrier network 110, and the Internet 101 all run on a packet based data transfer protocol characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. Certain VoIP end user devices 118 utilize an IP access point 120 to access the larger IP network. The IP access point 120 may be wired, wireless (e.g., WiFi), or a combination wired/wireless access point such as those illustrated in FIG. 1. A VoIP communication device 118 may communicate with an IP access point 120 to gain access to the larger IP network 101 and other communication devices. The VoIP communication device 118 has been illustrated as a wireline type device but may just as easily be a wireless device communicable with the IP access point 120 over, for instance, one or more of the 802.11 protocols.

In certain embodiments, mobile carrier network(s) 110 include cellular networks or portions of cellular networks based on GSM, LTE, CDMA, and/or any other cellular network standards. IP based data networks 122, 101 include, for example, the Internet, one or more intranets, wide area networks (WANs), local area networks (LANs), and the like, portions or all of which may be wireless and/or wired. For instance, an IP based data network 122, 101 may be a wireless network or a portion of a wireless network implemented using an IEEE 802.11 standard, WiMAX, and/or any other wireless data communication standard. As is known in the art, the resources the various networks 108 (PSTN), 110 (Mobile Carrier), 122, 101 (IP Based) may interface with the call server 102 through gateway devices, routers and/or other appropriate devices (not shown). Similarly, the hybrid mobile devices 124 may interface with the various networks 108 (PSTN), 110 (Mobile Carrier), 122, 101 (IP based) and alternative networks 115 through appropriate access points 111, 112, 120 (some not shown).

Communication sessions get more complicated when the communication devices are associated with different networks. For instance, a POTS phone placing a call to a wireless handset or a VoIP phone calling a POTS phone. In these scenarios, and others, there is an interface between the networks that serves to resolve any differences so that a communication session may be connected and maintained. As described above there may be an intervening network between two endpoint networks. For instance, each mobile carrier network 110 includes an interface to the PSTN 108 such that calls crossing that interface can be handled by the receiving network whether it is a mobile carrier network 110 or the PSTN 108. Similarly, each VoIP service provider on an IP packet based network 122, 101 includes an interface to the PSTN 108 such that calls crossing that interface can be handled by the receiving network whether it is an IP packet based network 122, 101 or the PSTN 108. Thus, the PSTN 108 often serves as a common routing network for endpoint communication devices that are associated with other networks. It is possible to create a VoIP interface such that IP packet based networks 122, 101 can interface directly with mobile carrier networks 110.

Each network service provider may provide equipment (communication devices) and service plans to its subscribers. These service plans can vary greatly in cost depending on the expected use of network resources. In addition, some service plans may bundle data and voice services in the cost of the service plan. This is often the case for mobile carrier network 110 subscribers since the ability to access data networks such as the Internet on a mobile device is a desired service. This is especially the case when a WiFi data connection is out of range. As a result, bundled voice and data services can place a significant burden on the mobile carrier network resources that can lead to use restrictions for bundled voice/data plans.

One approach that addresses the mobile network congestion problem is a communication device that may be characterized as a hybrid mobile device 124. The hybrid mobile device 124 may be associated with network infrastructure that defaults telephony services to a WiFi connection 123 using, for instance, VoIP over an 802.11 protocol via an IP access point 120. The hybrid mobile device 124 may default to WiFi mode when available and may only switch to a mobile carrier network 110 connection via a radio transmission scheme 125 to a base station 112 (cellular mode) when the WiFi connection 123 is lost, is unavailable or degrades in quality to the point that the connection can no longer support telephony services. For telephony services, however, such a soft handoff between heterogeneous networks is a more daunting and complex process.

One implementation of a soft handoff of a voice call between heterogeneous networks involves associating two telephone numbers to a hybrid mobile device 124. A first telephone number may be characterized as a 'data' telephone number that is based on a VoIP telephony scheme. The second number may be characterized as a 'mobile' telephone number that is used in conjunction with a radio transmission scheme 125 associated with a mobile carrier network 110. The subscriber may only be aware of the data number and not have actual knowledge of the mobile number. For all intents and purposes, the subscriber places and receives calls using the data telephone number. To reach the subscriber, a second communication device would dial the subscriber's data telephone number.

When the hybrid mobile device 124 is connected with an IP access point 120, telephony services and functions are handled using VoIP. To dial out, the subscriber dials the telephone number of the intended recipient's communication device. The intelligence within the hybrid mobile device 124 recognizes that the subscriber is attempting to place a call and notes the telephone number entered. The call from the hybrid mobile device 124 is routed to a call server 102 hosted in an IP based network 101 such as the Internet and establishes a first communication link. The call server 102 then determines the intended telephone number that was dialed by the subscriber and places a call to the communication device associated with that telephone number (called communication device). Upon connecting the second communication link between the call server and the called communication device, the call server 102 joins the first communication link with the second communication link to create a full-duplex communication session between the hybrid mobile device 124 and the called communication device.

The communication session will generally stay active until one of the respective communication devices terminates the call. Sometimes, however, the hybrid mobile device 124 may experience a loss of service with or degradation to the WiFi connection. This commonly occurs if the hybrid mobile device 124 moves out of range of the IP access point 120 or the quality of the connection with the IP access point 120 or intermediate LAN/WAN network 122 otherwise degrades. In such a scenario, it is necessary to handoff or hand over the call over to the mobile carrier network 110 to avoid terminating the communication session. This may be accomplished by creating a third communication link between the call server 102 and the hybrid mobile device 124. The third communication link, however, may be routed through the mobile carrier network 110 to the hybrid mobile device 124. When the first communication link is lost or is significantly degraded, it may be seamlessly replaced by the third communication link such that the call server 102 bridges or connects the third communication link with the second communication link to maintain the communication session.

Determining when to handoff the call to the mobile carrier network 110 may be based on any number of suitable factors. In a typical implementation, a manufacturer, carrier or network provider may determine a default set of connection characteristics below which a connection is handed off from the IP network 101 to the mobile carrier network 110. This default approach, however, may not take into account the differences between user expectations or tolerances regarding connection quality, differences in networks configurations and performance capabilities, and differences between devices used to establish the connection on behalf of a user (e.g. different mobile devices). Based on these and other factors, as described in more detail below, it may be advantageous to incorporate user feedback and/or user tolerance data into the algorithm used to determine when the handoff from the IP network 101 to the mobile carrier network 110 (or an alternative network 115 via an alternative network access point 111 or a different WiFi IP access point 120 for which network conditions may be more favorable) is required.

On inbound calls to the hybrid mobile device 124, a calling communication device dials the data number of the hybrid mobile device 124. This initiates a connection to the call server 102 as the data number is automatically routed to the call server 102. The call server then establishes a first communication link with the calling communication device. The call server 102 then establishes a second communication link with the hybrid mobile device 124. The call server defaults to WiFi mode in attempting to establish the communication link with the hybrid mobile device 124. If the hybrid mobile device 124 is not currently connected to an IP access point 120 and is therefore inaccessible via VoIP over WiFi, the call server will switch to cellular mode. In cellular mode, the call server will establish the second communication link over the mobile carrier network 110. This cannot be done, however, using the hybrid mobile device's 124 data number since that number is unknown to the mobile carrier network 110. To establish the second communication link between the call server 102 and the hybrid mobile device 124, the call server accesses a translation table within a database that includes data/mobile number pairs in which each pair may be associated with a hybrid mobile device 124. In this case, the call server will lookup the data number and have a mobile number returned. The call server 102 may then establish the second communication link by dialing the mobile number and establishing a connection to the hybrid mobile device 124. The call server may then join the first and second communication links to create the full-duplex communication session between the calling device and the hybrid mobile device 124.

The communication session will stay active until one of the respective communication devices terminates the call. While the communication session is in progress, the hybrid mobile device 124 may re-establish a WiFi connection. In such a scenario, it may be desirable to hand the call over to the VoIP network to reduce the burden on the mobile carrier network 110. This may be accomplished by creating a third communication link between the call server 102 and the hybrid mobile device 124. This time the third communication link may be routed over the VoIP network 101, 122 via an IP access point 120 to the hybrid mobile device 124. When the third communication link is sufficiently established, it may seamlessly replace the first communication link such that the call server 102 bridges or connects the third communication link with the second communication link to maintain the communication session.

In another outbound calling scenario, the hybrid mobile device 124 may not have an initial connection via WiFi to a packet based VoIP network 122, 101 or the WiFi connection may not be sufficiently good. An outbound call to a destination telephone number is established over the mobile carrier network 110 using the mobile number associated with the hybrid mobile device 124. For caller ID purposes, however, the calling number is the data number associated with the hybrid mobile device 124. The call is again routed to and through the call server 102. The first communication link is between the hybrid mobile device 124 and the call server. This is accomplished by having the hybrid mobile device 124 automatically place a call to the call server 102 using one of the pool of telephone numbers associated with the call server. Just prior to the call, the hybrid mobile device 124 may utilize the mobile carrier network's data services to send a message to the call server 102. The message to the call server 102 may contain the mobile and data numbers of the hybrid mobile device 124 and the destination telephone number such that when the call server 102 receives the call from the hybrid mobile device 124 using the mobile number, it can place a call to the destination telephone number and substitute the data telephone number in the caller ID field. Upon establishing the second communication link, the call server 102 may then join the first and second communication links to create the full-duplex communication session between the hybrid mobile device 124 and the destination device.

Figure 2:
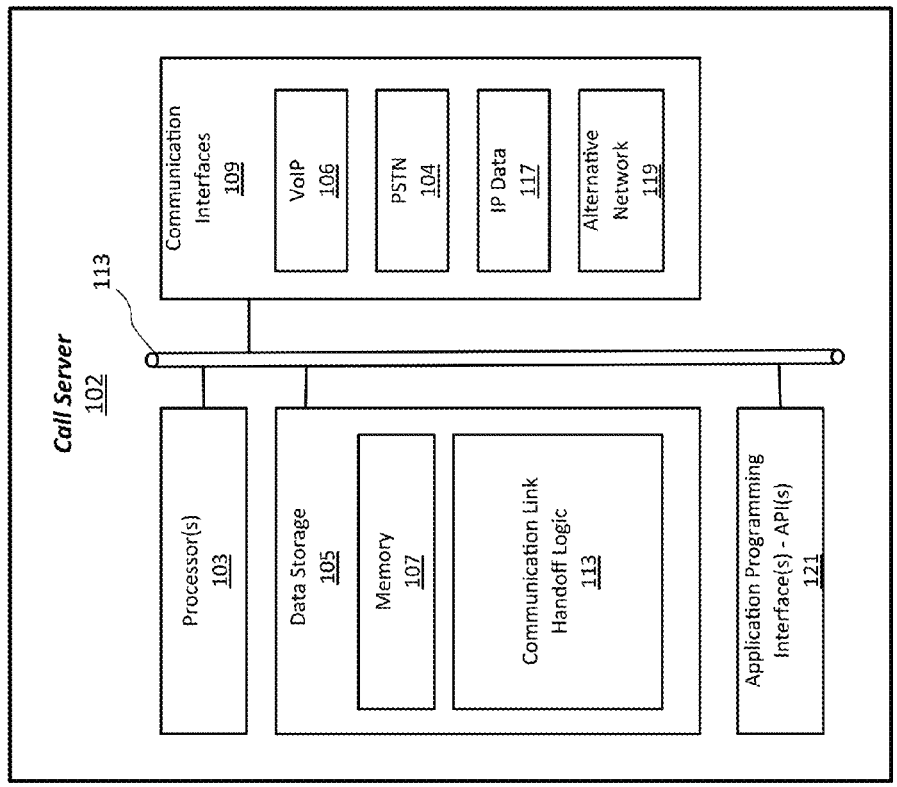
FIG. 2 illustrates an example block diagram for a call server.

FIG. 2 is a block diagram illustrating some of the functions of the call server according to one or more embodiments described herein. The call server 102 may comprise, for example, a server computer or any other system having computing capability. The schematic block diagram shows that the call server 102 may include at least one processor component 103 ("processor 103" hereinafter), at least one communication interface 109 (e.g., a network interface card or the like), and a data storage component 105, each of which is coupled to a local interface 113. The local interface 113 may comprise, for example, a data bus with an accompanying address/control bus or other bus structure as can be appreciated. Stored in the data storage component 105 are a memory 107 and communication link handoff logic 113 (e.g., software applications) that are executable by the processor 103 and that provide at least some of the functionality of the call server 102.

Alternatively, a plurality of call servers 102 may be employed and may be arranged, for example, in one or more server banks or computer banks or other arrangements. For example, a plurality of call servers 102 together may comprise a cloud computing resource, a grid computing resource, and/or any other aggregated or distributed computing arrangement. Such call servers 102 may be located in a single installation or may be distributed among different geographical locations. For purposes of convenience, the call server 102 is illustrated in FIGS. 1 and 2 and referred to herein in the singular. Even though the call server 102 is referred to in the singular, it is understood that a plurality of call servers 102 may be employed in various arrangements as described above.

The communication interface(s) 109 may include a voice-over-IP (VoIP) interface 106 adapted to exchange IP based telephony signaling (e.g., SIP) and/or media data with other IP network devices using a VoIP protocol. Another communication interface 109 may be a PSTN interface 104 adapted to convert incoming PSTN audio data to VoIP audio data and convert outgoing VoIP audio data to PSTN audio data. Still another communication interface 109 may be an IP data interface 117 adapted to exchange IP data with other IP network devices. This may include IP data exchanged with a mobile hybrid mobile device 124, 124 over an intermediate mobile carrier network 110. Yet another communication network interface 109 may be directed toward an alternative network 115 adapted to exchange data with a hybrid mobile device 124 or a hybrid mobile device 124. Examples of alternative network(s) 115 may include, but are not limited to, WiMAX and whitespace. A whitespace network may be characterized as one that utilizes frequency spectrum that is overlapping with that of broadcast television frequency spectrum.

The call server 102 may further include several inter-operable software modules collectively referred to as the communication link handoff logic 113 that is operable with application programming interfaces (APIs) 121 and communication interfaces 109 and configured to intelligently manage the communication session.

The communication link handoff logic 113 may be configured to physically or logically connect communication links. The communication link handoff logic 113 may also be configured to monitor network conditions and receive communication session data from the hybrid mobile device 124 regarding its connection with the IP access point 120 so as to intelligently determine the need for a soft handoff to the mobile carrier network 110. Communication session data may refer to any data relating to a communication session or its constituent communication link(s), such as, but not limited to, detected signal strengths, available networks, protocol and buffer statistics and analysis (e.g., jitter, latency, dropped packets, signal strength, link speed, etc.), environmental and/or geographical factors, the performance of access points and other network components, past interactions between or among communication devices, access points and other network components, context of conversations during voice calls, and other data points described herein. The communication link handoff logic 113 may be further configured to initiate a handoff from one communication link to another communication link.

More specifically, the communication link handoff logic 113 may cooperate with the APIs and network interfaces to physically or logically connect communication links to initially establish a communication session between communication devices and/or to perform a handoff of at least one communication link of a communication session from one network to another network. A communication session may be, for instance, between a hybrid mobile device 124 and a second telephony endpoint (e.g., 114, 116, 118). The handoff may be caused by an instruction or command received from or sent to the communication link handoff logic 113. The communication link handoff logic 113 may be configured to physically or logically establish communication links, join communication links, and sever communication links to a common or shared communication session based on commands or instructions received from or sent to the call server 102.

The communication link handoff logic 113 may also cooperate with the APIs and network interfaces to monitor and gather (receive) data pertaining to network conditions and communication device connections with various networks. The data may then be intelligently processed to predict or determine the need for a handoff of at least one communication link of a communication session. The data sent or received by the communication link handoff logic 113 may also include out of band and/or out of network signaling to or from a communication device to indicate that a handoff is needed. In such a case, the communication link handoff logic 113 may instruct the call server 102 to establish a new communication link and then initiate a handoff process once the new communication link has been established.

The communication link handoff logic 113 may cooperate with the APIs and network interfaces to effect a handoff of a first communication link between the call server 102 and the hybrid mobile device 124 to a second communication link between the call server 102 and the hybrid mobile device 124. The communication link handoff logic 113 may receive data and instructions that indicate a handoff may be needed imminently based on the degrading network conditions associated with the first communication link. The need may be determined based on a handoff profile established by a statistical modeling technique that was applied to a set of multiple VoIP network parameter data acquired via some form of user feedback or annoyance model data. The communication link handoff logic 113 may then execute certain instructions to establish a second communication link between the call server 102 and the hybrid mobile device 124. Once the second communication link has been established, the communication link handoff logic 113 may join the second communication link to the communication session with the other telephony device (114, 116, 118) prior to severing the first communication link between the call server 102 and the hybrid mobile device 124.

The communication link handoff logic 113 may be designed to fit a statistical and/or annoyance model pertaining to call quality parameters of a media stream between a communication device and the call server 102. The communication link handoff logic 113 may include, for example, logic to establish a handoff profile based at least in part on a statistical model fitted to multiple VoIP communication link parameters indicative of communication link quality or an annoyance model based on changing call quality over time.

The call server 102 may execute various applications and/or other functionality for, among other things, setting-up, managing and tearing-down communication sessions between communication devices 124 and 114, 116, 118. Also, various data may be stored in a data storage 105 via memory 107 of the call server 102. Data storage 105 illustrated in FIG. 2 may be representative of a plurality of data stores, as can be appreciated. The data stored in the data storage 105, for example, may be associated with the operation of the various applications and/or functional entities of the call server 102.

Figure 3:
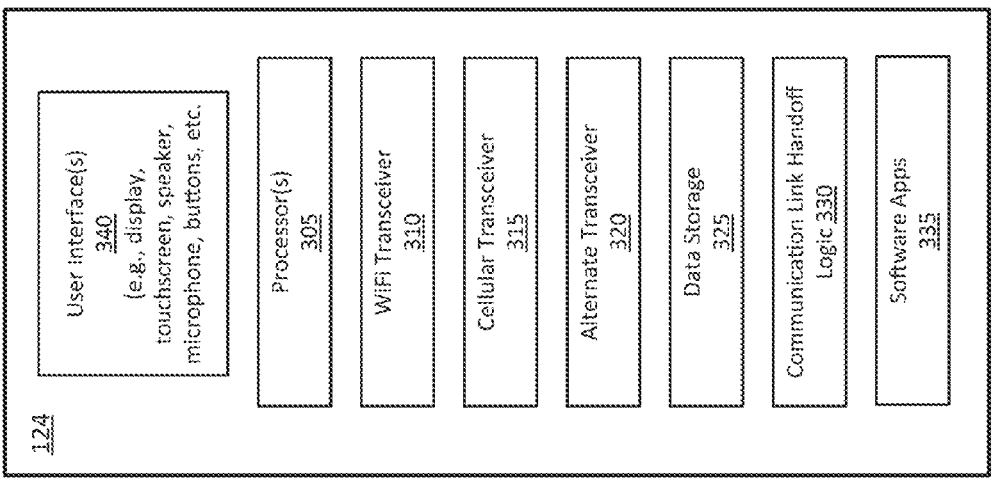
FIG. 3 illustrates an example block diagram for a hybrid mobile device.

FIG. 3 is a block diagram illustrating a hybrid mobile device 124 according to one or more embodiments described herein. The hybrid mobile device 124 may include a processor component or processor(s) 305 for controlling the various components and functions of the hybrid mobile device 124. The hybrid mobile device 124 may also include multiple RF transceivers such as, for instance, a WiFi transceiver 310, a cellular transceiver 315, and an alternate transceiver 320.

The WiFi transceiver 310 may be operable to communicate with an IP network access point 120 using one or more of the 802.11 wireless transmission protocols. Upon connection with an IP network access point 120, the hybrid mobile device 124 may exchange IP data with servers or other computers that are connected with or communicable with the Internet 101 via LAN/WAN 122. This may include the call server 102 shown in FIG. 1.

The cellular transceiver 315 may be operable to communicate with a mobile carrier network 110 for both circuit-switched voice and IP data communication. On the circuit-switched voice side, the mobile carrier network 110 may be based on GSM, CDMA, or other communication protocols while on the IP data side, the mobile carrier network 110 may be based on, for example, GPRS, EDGE, EV-DO, HSPA-D, HSPA-U, LTE, UMTS-WCDMA, UMTS-TDD, eHRPD etc.

In one embodiment, the alternate transceiver 320 may be a WiMAX transceiver that is operable to communicate with an IP network access point using one or more of the 802.16 wireless transmission protocols. Upon connection with a WiMAX network access point, the hybrid mobile device 124 may exchange IP data with servers or other computers that are connected with or communicable with the Internet 101 via WiMAX network 115. This may include call server 102 shown in FIG. 1. In another embodiment, the alternate transceiver 320 may be a whitespace transceiver that is operable to communicate with a whitespace network access point. The whitespace network, in turn, may be communicable with the Internet 101 to allow IP data communication between the hybrid mobile device 124 and servers or other computers that are connected with or communicable with the Internet 115. This may include call server 102 shown in FIG. 1.

The hybrid mobile device 124 may further include data storage 325, software applications 335, various user interface(s) 340 and its own communication link handoff logic 330. The data storage 325 may include, for example, one or more types of memory devices including, but not limited to, flash memory usable for ROM, RAM, PROM, EEPROM, and cache. The software applications 335 may include, for example, one or more software applications executable on or by the processor(s) 305 including, but not limited to, web browsers, email applications, application specific data and/or audio/video applications, call handoff applications, etc. The user interface(s) 340 may include, for example, a display, a touchscreen for soft-key input, speaker(s), microphone(s), a keyboard for hard-key input, and one or more buttons. The communication link handoff logic 330 may include, for example, logic to establish and execute a handoff profile based at least in part on statistically modeled user feedback regarding communication link quality and/or an annoyance model.

Figure 4:
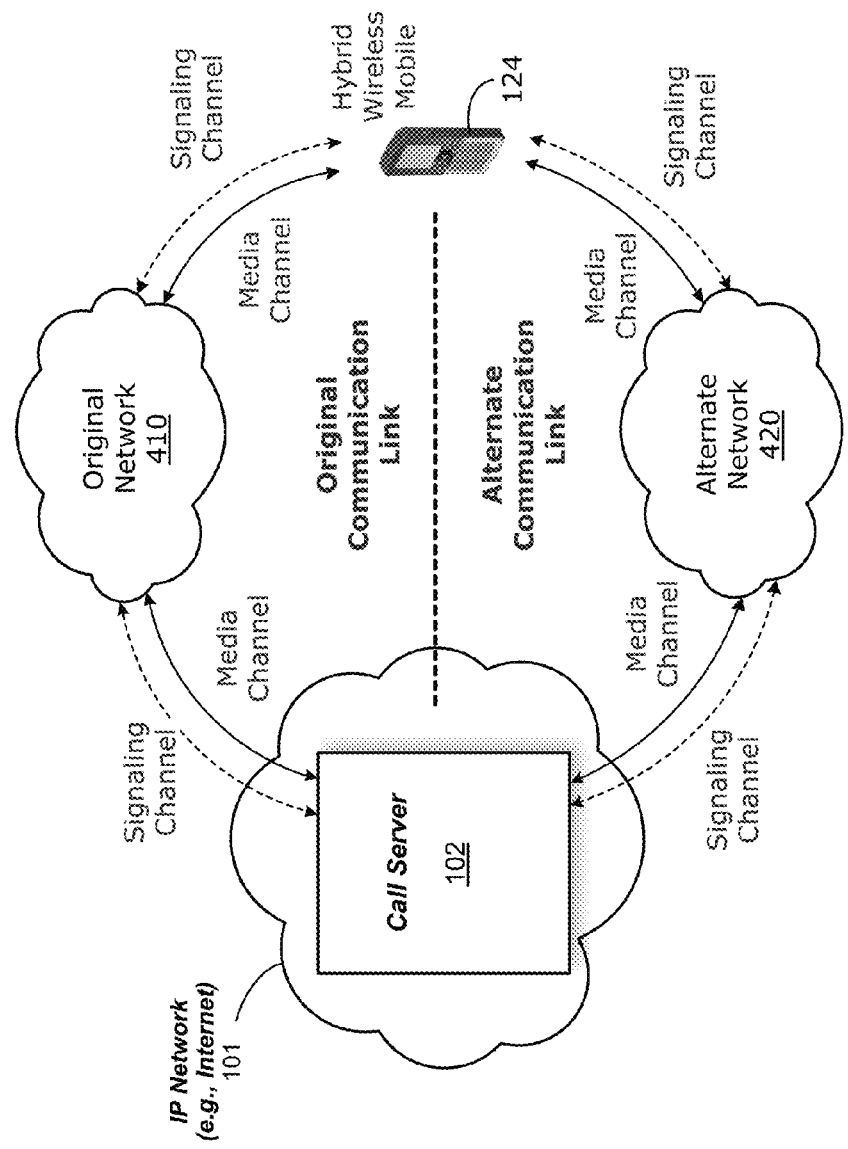
FIG. 4 illustrates an example of a first operating environment.

FIG. 4 is a block diagram illustrating a communication session handoff between a hybrid mobile device 124 and a call server 102 utilizing different networks 410, 420 according to one or more embodiments described herein. Once a call has been established between a hybrid mobile device 124 and another communication device with the call server 102 acting as a bridge connecting the two communication devices, the communication session will stay active until one of the respective communication devices terminates the call.

Sometimes, however, the hybrid mobile device 124 may experience a loss of service with or degradation to the original network 410 connection used to establish the call. The original network 410 may be a mobile carrier network 110 or an IP network 122/101. In such a scenario, it is necessary to hand the call over (e.g., handoff) to an alternate network 420 to avoid terminating the communication session. The alternate network 420 may be the opposite of the original network 410. For example, if the original network 410 was an IP network 122/101, the alternate network 420 may be a mobile carrier network 110 and vice versa. The embodiments are not limited to these examples. There may be other alternate network(s) 420 that are neither mobile carrier network(s) 110 or IP network(s) 122/101.

The handoff may be accomplished by creating an alternate communication link between the call server 102 and the hybrid mobile device 124. The alternate communication link, however, will be routed through the alternate network 420 to the hybrid mobile device 124. When the original communication link is lost or is significantly degraded, it may be seamlessly replaced by the alternate communication link such that the call server 102 bridges or connects the alternate communication link with the communication link to the other communication device to maintain the communication session.

To establish the alternate communication link, the hybrid mobile device 124 may initially send or receive an out of band or even an out of network signal to or from the call server 102. A call between the hybrid mobile device 124 and another communication device by way of call server 102 may be initially setup using the Session Initiation Protocol (SIP). IP addresses and ports are exchanged and an audio (and/or video) codec is negotiated for the exchange of media. Audio (and/or video) from both ends flows using the Real-time Transport Protocol (RTP) and the selected codec(s). Any further change in the call is accomplished using SIP (e.g., one party hangs up). The hybrid mobile device 124 may also maintain an open data channel with the call server 102 using, for example, a protocol called Message Queue Telemetry Transport (MQTT). MQTT is an open message protocol for machine-to-machine communication that enables the transfer of telemetry-style data in the form of messages from pervasive devices, along high latency or constrained networks, to a server or small message broker. Pervasive devices may range from, for example, sensors and actuators, to mobile phones, embedded systems on vehicles, or laptops and full-scale computers.

The MQTT channel is not involved in the initial call setup. As long as the communication device has some sort of network connection, the MQTT channel is available. The impending handoff signal may be sent from the communication device to the server using this data channel. The MQTT channel is out of band in the sense that it is not involved with the initiation or destruction of a communication session (e.g., phone call). Nor is it in the path of the exchange of media between the hybrid mobile device 124 and the call server 102. Additionally or alternatively, the impending handoff signal could be out of band in the sense that it uses an alternative such as, for example, a text message, white space, or LTE that may be referred to herein as out of network signals.

The out of band or out of network signal may instruct the call server 102 to initiate the process of establishing an alternate communication link between the hybrid mobile device 124 and the call server 102. The out of band or out of network signal may be the result of the hybrid mobile device 124 detecting poor or degrading original network connectivity or may be based on one or more other sensor inputs indicative of the impending need for a handoff. Once the out of band or out of network signal requesting establishment of an alternate communication link is received, the call server 102 may initiate the alternate communication link by first determining on what network the original communication link is established. The call server 102 may then dial the hybrid mobile device 124 using the telephone number associated with the alternate network connection 420 to the hybrid mobile device 124. The hybrid mobile device 124 may then automatically answer the call without user notification or intervention. The call server 102 may then join the alternate communication link with communication link to the other communication device to maintain the communication session before severing the original communication link between hybrid mobile device 124 and the call server 102. Alternatively, the hybrid mobile device 124 may sever the original communication link once the alternate communication link is established.

For example, if the original network connection 410 for the original communication link is a VoIP based WiFi connection, the alternate communication link may be established over a mobile carrier network via a cellular system. The hybrid mobile device 124 will have both a data telephone number associated with, in this example, the original network 410 and a mobile telephone number associated with the alternate network 420. The alternate communication link may be routed over the alternate network 420 by having the call server 102 send call establishment signaling to the hybrid mobile device 124. Since the hybrid mobile device 124 is currently connected to the call server on the original communication link, the incoming new call signaling may be acted upon without notifying the user. For instance, the hybrid mobile device 124 may not ring, vibrate, or display a call waiting message pertaining to the incoming call from the call server 102. Rather, the hybrid mobile device 124 may automatically answer the new incoming call over the alternate network 420 based on a particular piece of information in the signaling data that identifies the new call as being a handoff for the current call. For example, the out of band or out of network signal sent by the hybrid mobile device 124 to the call server 102 may include a flag or data bits uniquely signifying a request to create an alternate communication link between the hybrid mobile device 124 and the call server 102 and switch from the original communication link to the alternate communication link. In another embodiment, the call server may use a particular telephone number as the source number when signaling the hybrid mobile device 124. The particular number may be dedicated to handoff calls only.

The technique(s) described may work whether the original network 410 is an IP based VoIP network 122/101 and the alternate network 420 is a cellular based mobile carrier network 110 or vice versa. In addition, there may be other types of non-cellular based network(s) that can function as the original network 410 or alternate network 420. The embodiments are not limited to these examples.

The foregoing description relates generally to the process of handing a call off from an IP based VoIP network 101 to a cellular based carrier network 110 or an alternate network 420 (and vice versa). While the handoff process itself is useful in improving the user experience and decreasing network load by utilizing an IP based VoIP network 101 when possible, the determination regarding when to initiate the handoff and what parameters to analyze when determining that the handoff should be performed is an area that can be improved. Currently, a device manufacturer, network carrier or other similar party in the communications chain assigns default handoff metrics. This process, however, does not account for personal user preferences, user tolerance for communication link quality degradation, variations between different networks and devices and the like. Therefore, in various embodiments it may be advantageous to incorporate such data into the algorithm used to determine when a handoff should occur for that user. The embodiments are not limited in this respect.

The capability to handoff a call from an Internet Protocol (IP) network to a circuit-switched cellular network exists. But determining when that handoff should be made for a given communication session (e.g., telephone call) greatly affects the user experience. A call on an IP network may utilize an 802.11 WiFi communication link alone or multiple communication links comprising an 802.11 WiFi communication link multi-streamed or bonded with cellular IP data communication link.

Figures 5, 6:
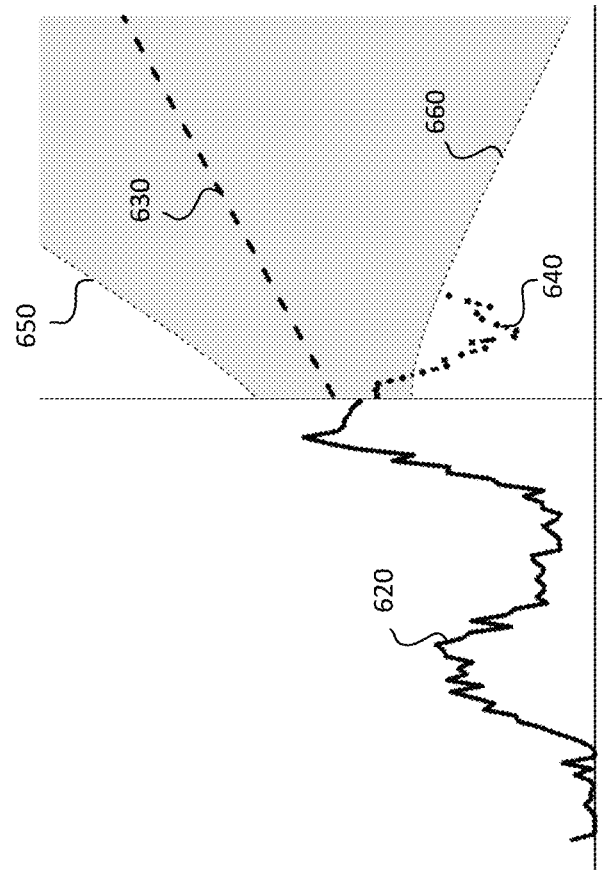
FIG. 5 illustrates an example of a mean opinion score table.
FIG. 6 illustrates an example of a scenario of predicting WiFi call degradation with a linear trend.

FIG. 5 illustrates an example of a canonical model of audio call quality represented by a mean opinion score table. The mean opinion score (MOS) is a simple table correlating the quality of a telephone call with a raw score between 1 and 5. Each of the scores corresponds with a characterization of the degree of impairment. In the example illustrated, a score of five (5) is the highest and corresponds to imperceptible impairment and excellent call quality. A score of four (4) corresponds to a perceptible but not annoying impairment and good call quality. A score of three (3) corresponds to a slightly annoying impairment and fair call quality. A score of two (2) corresponds to an annoying impairment and poor call quality. Lastly, a score of one (1) corresponds to a very annoying impairment and bad call quality. The mean opinion score is informative but does not impact handoff decisions because it cannot directly be a handoff algorithm, quantitatively or qualitatively. For example, the mean opinion score does not determine how long someone can or will put up with a "slightly annoying" or "annoying" call before terminating the call.

Converting the subjective mean opinion score canonical model into an objective modeling framework capable of informing a handoff decision provides a mechanism to improve user perception of call quality.

A hybrid mobile device 124 on a call can measure, in real-time, Voice-over Internet Protocol (VoIP) variables or parameters that serve as a proxy for call quality. Similarly, a network based call server mediating the call may also be able to receive and process the real-time VoIP parameters. When VoIP network call quality degrades to a certain level, the device may handoff from an IP based network to a circuit-switched cellular based network.

Although call quality can be regarded as subjective, it is likely that a wide majority of users are able to differentiate good calls from bad calls and mediocre calls. With that as the case, a model to inform handoff can be crafted that (i) does not require large-scale user input, (ii) can be easily or naturally adapted to groups of users or individual users, and (iii) can incorporate multiple call quality metrics.

The objective portion of the model is the concept of annoyance and annoyance tolerance. Poor VoIP call quality will annoy users, and they will tend to favor circuit-switched calls in that moment that are presumably better quality. Annoyance is proportional to the product of call degradation and duration; very bad quality for short periods of time and mediocre call quality over long periods of time are equally annoying. Annoyance is cumulative, and builds as the user experiences more or longer instances of poor to bad quality. There is a bound to annoyance that is defined by a user's memory; as the call continues, a user will forget about poor quality early in the call. Mathematically, this manifests as a moving window of time that cumulative annoyance is computed over.

A handoff may be triggered when the annoyance exceeds the tolerance for annoyance over time. An annoyance tolerance function may be derived from empirical data. Call quality can be simulated in a controlled environment. For instance, users may be queried as to how long they would tolerate calls at varying levels of call quality. This "maximum tolerance" may range from "indefinitely" (the call is not bad enough to hang up) to less than a second of tolerability. Some simulated call qualities (potentially any call that is not "perfect") may have been annoying and could contribute to annoyance, but not annoying enough to drive a user to terminate the call. The maximum time a user would stay on a call at a given quality may be used as an input to define a user's annoyance tolerance.

Although many different scenarios may generate the same level of annoyance over time, those annoyances may or may not be equally tolerable. Generally, very bad quality for a short period of time is less tolerable than mediocre quality for a longer period. In other words, we have chosen annoyance to be the consistent measure across all listeners and allow tolerance to vary between individual listeners. As illustrated later in FIG. 11, this principle is incorporated via the shape of a maximum tolerance function.

A user's preference for handoff sensitivity may be stored as a set of constants and functions that can be studied empirically. Users tend to agree, with a high degree of precision, on maximum tolerances and annoyance cutoff thresholds. These maximum tolerances may then be used as a default setting for everyone. Still, it is important to retain some flexibility to adjust the model, either broadly or down to individual user preference tuning, to balance call quality and cost incurred. The annoyance model may also be generalized to multiple measures of call quality that may be translated into a call degradation measurement.

Call degradation may be measured as a combination of conditions present over a system of devices that may contain an 802.11 network (e.g., LAN) and the Internet (e.g., WAN). Because the full state of the system is not available to each individual entity, these conditions are often unpredictable when analyzed by a single device. Current handoff models analyze call degradation, or some proxy of it, to find trends over time. These trends are then used, either implicitly or explicitly, to forecast future conditions of the network. However, since call degradation is often unpredictable, a forecast may often be unreliable. Whereas a trend model employs a mathematical derivative for analysis, the accumulated annoyance is related to the anti-derivative of call degradation. It measures the cumulative effect of call degradation based on what measurably occurred in the recent past, instead of attempting for forecast into an uncertain future.

Predictions based on the derivative may easily be misleading because WiFi quality is extremely variable. Linear trend lines (and a measure of their variability) are often employed for predictions, but such predictions are useless outside of a very local window especially when the underlying data are volatile. FIG. 6 displays a scenario of predicting WiFi call degradation with a linear trend. The measured call degradation is displayed as a solid black line 620. Linear predictions of future poor quality may be made continuously throughout the call; one such example is shown as the dashed line 630. The shaded region between dashed line 650 and dashed line 660 depicts a pointwise 95% prediction interval. Despite this wide prediction band, the true call degradation can easily fall outside of the prediction region after only a few more measured samples, as shown by the continued clashed line 640. Using linear predictions may result in many "false positives" where a handoff may occur too soon, even when IP network quality is sufficient for the call.

The techniques described herein eschew a derivative based predictive model of WiFi call degradation in favor of an derivative (i.e., integral) based objective model.

FIG. 7 illustrates multiple IP data streams organized into discrete time intervals comprised of IP data packets. Each of the IP data streams (IP stream_1 705, IP stream_2 710, and a combined or bonded IP stream 715) is carrying the same payload data in their respective packets, denoted by horizontally aligned blocks (e.g., 735, 740, 745). In an example, the IP streams 705, 710, 715 are carrying voice data for a telephone call. Specifically, each IP stream 705, 710, 715 is carrying the same voice data for the telephone call. IP stream_1 705 may be conveyed over an 802.11 WiFi network connection to and from call server 102 while IP stream_2 710 may be conveyed over a cellular IP data network connection to and from call server 102. The bonded IP stream 715 may be characterized as a combination of IP stream_1 705 and IP stream_2 710 in which individual corresponding packets from each IP stream may be used to compose the bonded IP stream 715. For instance, the bonded IP stream 715 will use packets from IP stream_1 705 if they reach the call server in a timely manner and use corresponding packets from IP stream_2 710 if the packets from IP stream_1 705 if do not reach the call server in a timely manner and vice versa. Under this technique, the bonded IP stream 715 will always be the highest quality it can be since it incorporates packets from both IP streams to maintain the highest possible quality.

For instance, IP stream_1 705 is missing 19 of 75 packets (25% packet loss) while IP stream_2 710 is missing 24 of 75 packets (32% packet loss). However, the bonded IP stream 715 is only missing 5 of 75 packets (7% packet loss).

FIG. 7 also organizes the packets into discrete time intervals (t(i) 720, t(i+1) 725 through t(n) 730) for illustrative purposes only. In this example, each sampling interval (denoted by the bracketed portions and explained later) spans 500 ms and captures 25 packets. The sampling interval of 500 ms is somewhat arbitrary and may be adjusted if desired.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates an example of a first logic flow 800. Logic flow 800 may be representative of some or all of the operations executed by one or more logic, features, or devices described herein, such as any devices, systems, methods and/or techniques described above with references to FIGS. 1-7 for example. More particularly, logic flow 800 may be implemented by communication link handoff (CLH) logic 113, 330 of a hybrid mobile device 124 or call server 102 in some embodiments. In various embodiments, the logic flow 800 may be representative of some or all of the operations associated with obtaining and utilizing empirical data to establish or update and execute a handoff profile based on annoyance such that a live call may be handed off from one network to another should certain conditions be met. Other embodiments are described and claimed.

FIG. 8 contemplates a multi-streaming approach that also utilizes a cellular IP data stream (e.g., IP stream_2 710) in conjunction with the 802.11 WiFi data stream (e.g., IP stream_1 705) to handle the call. In such a scenario, the media stream for the call is simultaneously exchanged with a call server 102 over an 802.11 WiFi communication link and a cellular IP data communication link. The call server 102 and the hybrid mobile device 124 are each capable of sending parallel media streams over the different communication links as well as merging them together into the highest possible quality data stream. In areas where the cellular IP data communication link is weak, it may be necessary to initiate a handoff to a circuit-switched cellular based network prior to completely losing the 802.11 WiFi network communication link to maintain a seamless experience for the user.

Block 804 is indicative of a call being connected and a communication session established between a first user on a hybrid mobile device 124 capable of voice communications on multiple networks and a second user. A call server 102 mediates the communication session between the two users. The variable "X" may be used to represent the call quality values in the aggregate and generally. Without loss of generality, X is taken to be a measure of call degradation so a larger X implies worsening call quality. For example, increased jitter, more dropped packets, additional latency, sub-optimal signal strength, and/or reduced link speed would drive t to value of X higher for a given time. As the call is ongoing, certain call quality values X1 for IP stream_1 705 and X2 for IP stream_2 710 are obtained at block 808 and stored at block 816. In block 812, the same call quality values Xb are determined, based on the combination of IP stream_1 705 and IP stream_2 710 illustrated in FIG. 7, for the bonded IP stream 715 and similarly stored in block 816.

This may occur on either the call server 102 side or on the hybrid mobile device 124 side. The call quality values X may be stored over time "t" and sequentially labeled/indexed. The variable "i" may be used as generic indices for call quality values X at time samples t. Thus, a sample set of call quality values such as X(i), X(i+1), . . . X(i+10) may be stored at block 612. The sample rate may be adjustable but for purposes of illustration, the sample rate may be set to 500 ms meaning a call quality measurement X(i) is stored every half second. The call quality values X(i) may include, but are not limited to, Voice-over IP (VoIP) characteristics such as jitter, latency, dropped packets, signal strength, link speed, etc.

In addition, a time window of length "N" may be set that defines a relevant period within which to save sampled call quality values X(i). For example, if N=30 seconds, then a full set of call quality values X(i) for that time window would comprise sixty (60) samples X(1), X(2), ..., X(60) based on a sampling rate of 500 ms and assuming that the samples are captured in exact periodicity, which may not be the case. Just as for the sampling rate, the length N of the time window may also be adjustable.

The following process decides the ideal time for handing over a VoIP call from a bonded IP stream 715 (using IP stream_1 705 and IP stream_2 710) to a circuit-switched cellular network. Two critical decision points exist in the process: (1) an evaluation of the degradation existing on the bonded IP connection and (2) a safety valve for protecting the user experience in a scenario when one of the two IP connections cannot sustain the call on its own. To reach these decision points, we continue describing the process in full. In block 820, an accumulated annoyance value A1(i), A2(i), and Ab(i) is calculated for each of IP stream_1 705, IP stream_2 710, and the bonded IP stream 715 using the call quality values X1(i), X2(i), and Xb(i). Additional details for calculating the accumulated annoyance are described with reference to FIG. 9. At block 824, a handoff threshold, also referred to as the annoyance tolerance threshold, is acquired and labeled H1(i), H2(i) and Hb(i) for the respective IP streams. Additional details for determining the handoff threshold are described with reference to FIG. 10. At decision block 828, the process evaluates the degradation of the bonded VoIP call. If the accumulated annoyance Ab(i) for the bonded IP stream 715 is greater than the handoff threshold Hb(i) for the bonded IP stream 715, a network handoff from the IP network(s) to a circuit-switched cellular network is initiated at block 832. This causes the communication link between the first user on the hybrid mobile device 124 and the call server 102 to switch networks. If accumulated annoyance Ab(i) is less than or equal to annoyance tolerance Hb(i), then control moves to block 836. Blocks 836, 840, and 844 compose the safety valve to prevent a poor call experience that could occur due to a sudden loss of the connection bonding.

The decision block 836 compares the accumulated annoyance A2(i) to the annoyance tolerance H2(i) from an isolated IP stream_2 710. The values A2(i) and H2(i) generally do not correspond directly with the call degradation, because they are measurements taken prior to the IP connection bonding detailed in FIG. 7. Rather, the values A2(i) and H2(i) represent a hypothetical VoIP call, in the case of a complete failure of IP stream_1 705. If A2(i) is less than or equal to H2(i), then IP stream_2 710 is capable of serving (but not required to serve) the VoIP call by itself, without bonding; control is returned to block 808 effectively re-cycling the entire procedure for the next iteration of call quality values X1(i+1), X2(i+1), and Xb(i+1). If, however, A2(i) has exceeded H2(i), conditions of the 802.11 WiFi network are evaluated at block 840 to determine if a change to the network topology is predicted or impending. The most likely topological change is a disconnect of hybrid mobile device 124 from the 802.11 WiFi network access point. The hybrid mobile device 124 has access to measurements of the 802.11 connection's current capabilities, which are a proxy for the surrounding environment; for example, changes in connection signal strength can approximate changes in distance between the hybrid mobile device 124 and the 802.11 WiFi network access point. Block 844 analyzes environmental trends to predict a disconnect at the 802.11 protocol level. If such a prediction is made, control is sent to block 832 where a handoff to a circuit-switched cellular communication link is initiated. If the 802.11 WiFi conditions do not predict an impending disconnect at block 844, control is returned to block 808 effectively re-cycling the entire procedure for the next iteration of call quality values X1(i+1), X2(i+1), and Xb(i+1).

FIG. 9 illustrates an example of a second logic flow 900. Logic flow 900 may be representative of some or all of the operations executed by one or more logic, features, or devices described herein, such as any devices, systems, methods and/or techniques described above with references to FIGS. 1-7 for example. More particularly, logic flow 900 may be implemented by communication link handoff (CLH) logic 113, 330 of a hybrid mobile device 124 or call server 102 in some embodiments. In various embodiments, the logic flow 900 may be representative of some or all of the operations associated with calculating an accumulated annoyance value for use in determining whether to initiate a handoff of a call from an IP based network to a circuit-switched cellular network. Other embodiments are described and claimed.

Block 904 is indicative of an annoyance subroutine being invoked from block 820 of FIG. 8. The CLH logic 113, 330 may then fetch sample call quality measurements X1(i), X2(i), and Xb(i) at time t(i) at block 908. At block 912, all of the sample indices for call quality values X1, X2, and Xb that are still in memory are collected. Still in memory may be characterized as those indices "j" that fall within time window N. Both j and i are indices for call quality values X1, X2, and Xb. Index j is a subset of index i. Specifically, index j includes all indices from the current time t(i) (inclusive) back to (t(i)−N) (exclusive). Thus, j is any index representing a sample that is newer than N seconds old. This index set may be mathematically denoted as S={j: t(j)>t(i)−N}. At block 916, an individual sampled annoyance value, a(j), is computed for each X1(j), X2(j), and Xb(j) wherein a1(j)=X1(j)*[t(j)−t(j−1)]*(X1(j)>$C_0$), a2(j)=X2(j)*[t(j)−t(j−1)]*(X2(j)>$C_0$), and ab(j)=Xb(j)*[t(j)−t(j−1)]*(Xb(j)>$C_0$), where "$C_0$" represents a first annoyance threshold level and is defined below. If (X1(j)−$C_0$) is less than or equal to zero (0), then the entire individual sampled annoyance value a1(j) is set to zero (0) indicating no annoyance for index j. If (X2(j)−$C_0$) is less than or equal to zero (0), then the entire individual sampled annoyance value a2(j) is set to zero (0) indicating no annoyance for index j. If (Xt(j)−$C_0$) is less than or equal to zero (0), then the entire individual sampled annoyance value ab(j) is set to zero (0) indicating no annoyance for index j. The a1(j), a2(j), and ab(j) annoyance value calculations are repeated for all j indices in S comprising time window N.

At block 920, the accumulated annoyance A(i) is calculated for the entirety of the time window that captures the past N seconds of data. Mathematically, accumulated annoyance for window N may be expressed as A1(i)=Σ(a1(j): j in S), A2(i)=Σ(a2(j): j in S), and Ab(i)=Σ(ab(j): j in S). The accumulated annoyance values A1(i), A2(i), and Ab(i) are then returned to the main comparison in block 828 of FIG. 8 to be used in determining whether to initiate a handoff.

Figure 10:
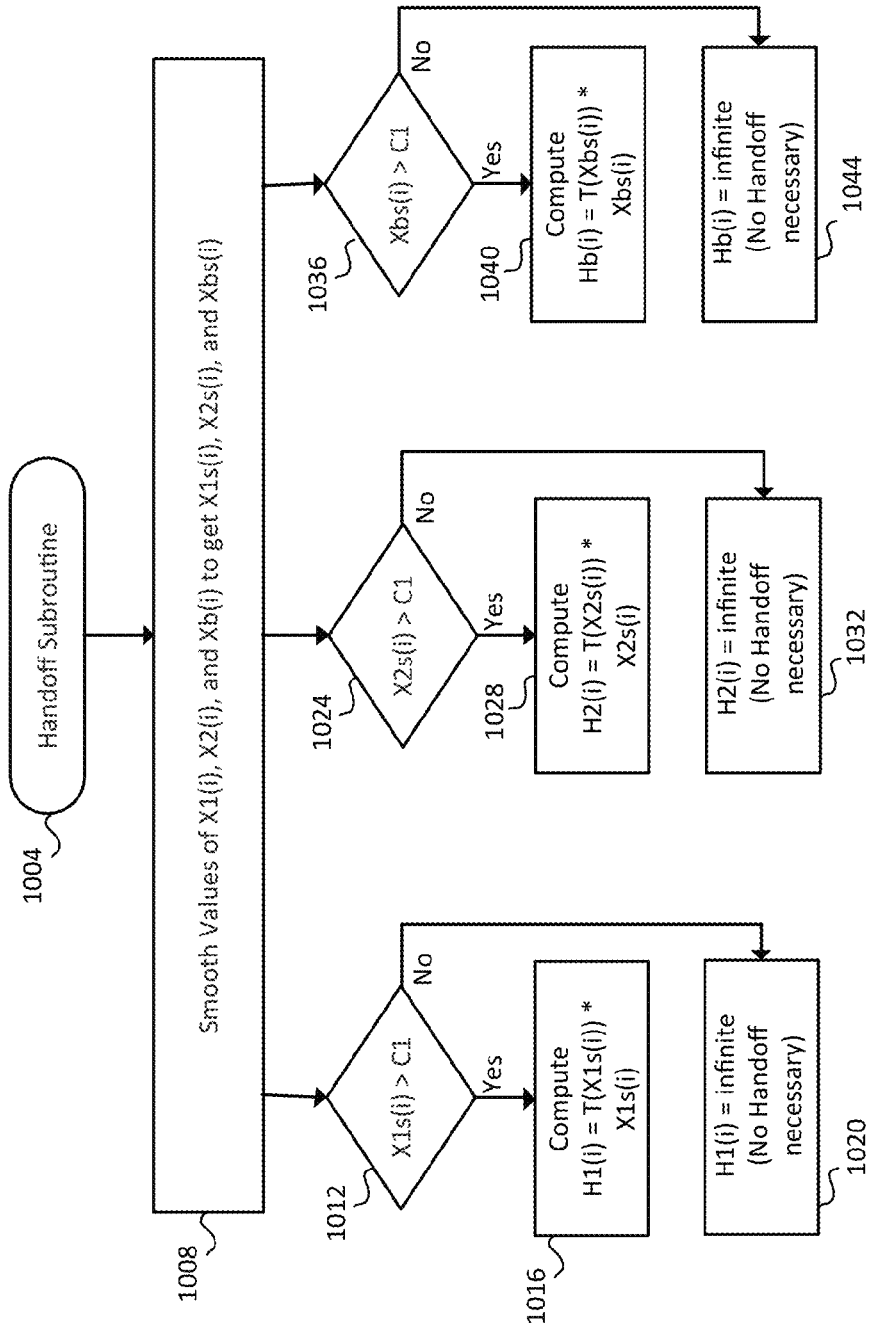
FIG. 10 illustrates an example of a third logic flow.

FIG. 10 illustrates an example of a third logic flow 1000. Logic flow 1000 may be representative of some or all of the operations executed by one or more logic, features, or devices described herein, such as any devices, systems, methods and/or techniques described above with references to FIGS. 1-7 for example. More particularly, logic flow 1000 may be implemented by communication link handoff (CLH) logic 113, 330 of a hybrid mobile device 124 or call server 102 in some embodiments. In various embodiments, the logic flow 1000 may be representative of some or all of the operations associated with determining whether to initiate a handoff of a call from an IP network network to a circuit-switched cellular network. Other embodiments are described and claimed.

Before getting to the process of FIG. 10 some background and context is helpful. A tolerance "T" function defines a user's tolerance or maximum duration in seconds) for had call quality as measured by call quality values, X. As stated before, call quality values may include, but are not limited to, jitter, dropped packets, latency, strength, link speed, etc. As described above, X may be used as shorthand notation for the call quality values of multiple IP data streams X1, X2, and Xb.

There is some range of call quality that a user can tolerate indefinitely; this may be anywhere from "perfect" call quality to slightly degraded quality that is not bad enough to drive the user to become frustrated with the call experience and terminate or seek to handoff the call. Note that a "perfect" portion of a call (which is trivially infinitely tolerable) is defined as when $X \leq C_0$. When $C_0 < X \leq C_1$, the user will become annoyed, but is still willing to tolerate the conditions infinitely long. When $X > C_1$, the call is annoying enough to drop the user's tolerance duration (T) of the call to a finite level. As X continues to increase above $C_1$ and call quality becomes even worse, the tolerance duration T continues to decrease down to a very short duration (possibly at or under 1 second). Both $C_0$ and $C_1$ have been previously determined likely through empirical data gathering over a sample of users.

Tolerance as a function of X defines a T(X) curve. T(X) is infinite when $X \leq C_1$. When $X > C_1$, T(X) is a monotonically decreasing function. It is possible to measure T(X) with user feedback. Controlled and known amounts of degradation can be injected into a VoIP call, and users can be polled for how long they would remain on the call. This can be repeated for multiple different X values across multiple different users to define a "default" T(X) profile including values for $C_0$ and $C_1$ that is acceptable for most people. It is also possible to tune the T(X) function on a per-user basis for more fine-grained control of a handoff trigger.

A generalized annoyance tolerance function (e.g. handoff threshold), H(i), is the tolerance for a user's cumulative annoyance on a call. To ensure that the units on annoyance and annoyance tolerance are comparable, define H(i)=T(X)*X so that both annoyance A(i) and annoyance tolerance H(i) are based in time and can be termed "call degradation-seconds." It is required that H(X) also be monotonically decreasing which could lead to simple restrictions on T(X).

Both the accumulated annoyance, A(i), and the annoyance tolerance, H(i), are computed in regular intervals (e.g., a sampling rate) during the call. Because the call quality values X may be very spiky over a call, a smoothed measurement of X, called Xs, is fed into the tolerance function T. The use of Xs mitigates "false positive" handoffs that may occur when brief but extreme spikes in bad network quality appear. However, because this spikiness does contribute to a user's annoyance level, the unsmoothed call quality values X are used to compute accumulated annoyance A(i).

Block 1004 is indicative of a handoff subroutine being invoked from block 824 of FIG. 8. The CLH logic 113, 330 may smooth the call quality measurement data for each of the IP streams X1(i) into X1s(i), X2(i) into X1s(i), and Xb(i) into Xbs(i) at block 1008. This may be achieved by multiplying a weighting factor that reduces the abruptness of call quality changes from sample index to sample index. This process is further described and illustrated in some of the graphs in FIG. 11.

At block 1012, the currently sampled and smoothed call quality measurement for IP stream_1 705 X1s(i) is compared against the second annoyance threshold $C_1$. Recall that $C_1$ refers to an annoyance threshold above which the call quality measurement X1s(i) corresponds potentially to a level of annoyance for which a user may terminate a call. A call quality measurement X1s(i) above $C_1$ may cause the determination of the handoff cutoff value H1(i) denoted as T(X1s(i))*X1s(i) at block 1016. A call quality measurement X1s(i) below $C_1$ correlates to an infinite handoff cutoff value H1(i) at block 1020 meaning the user would not terminate a call for this relatively satisfactory call quality measurement X1s(i). The value of H1(i) may then be returned to the main comparison in block 828 of FIG. 8 to be used in determining whether to initiate a handoff.

At block 1024, the currently sampled and smoothed call quality measurement for IP stream_2 710 X2s(i) is compared against the second annoyance threshold $C_1$. Recall that $C_1$ refers to an annoyance threshold above which the call quality measurement X2s(i) corresponds potentially to a level of annoyance for which a user may terminate a call. A call quality measurement X2s(i) above $C_1$ may cause the determination of the handoff cutoff value H2(i) denoted as T(X2s(i))*X2s(i) at block 1028. A call quality measurement X2s(i) below $C_1$ correlates to an infinite handoff cutoff value H2(i) at block 1032 meaning the user would not terminate a call for this relatively satisfactory call quality measurement X2s(i). The value of H2(i) may then be returned to the main comparison in block 828 of FIG. 8 to be used in determining whether to initiate a handoff.

At block 1036, the currently sampled and smoothed call quality measurement for the bonded IP stream 715 Xbs(i) is compared against the second annoyance threshold $C_1$. Recall that $C_1$ refers to an annoyance threshold above which the call quality measurement Xbs(i) corresponds potentially to a level of annoyance for which a user may terminate a call. A call quality measurement Xbs(i) above $C_1$ may cause the determination of the handoff cutoff value Hb(i) denoted as T(Xbs(i))*Xbs(i) at block 1040. A call quality measurement Xbs(i) below $C_1$ correlates to an infinite handoff cutoff value Hb(i) at block 1044 meaning the user would not terminate a call for this relatively satisfactory call quality measurement Xbs(i). The value of Hb(i) may then be returned to the main comparison in block 828 of FIG. 8 to be used in determining whether to initiate a handoff.

FIG. 11 illustrates an example of a collection of graphs 1100 according to an embodiment of the invention. There are several graphs shown in FIG. 11 and they relate to one another in various ways. To begin, the x-axis is defined in units of time while the upper y-axis is defined in terms of "call degradation" and the lower y-axis is defined in terms of "call degradation seconds." Call degradation helps define concepts such as annoyance which, in turn, may be used to determine a handoff threshold for a given call. In addition, the variables and functions defined by X(i), H(i) and A(i) are referenced generically but are meant to apply equally to each IP stream (i.e., IP stream_1 705, IP stream_2 710, and the bonded IP stream 715).

The thin jagged line graph 1150 represents the instantaneous aggregated call quality values X(i) from FIGS. 8-9 whereas the dashed line graph 1160 represents a smoothed version Xs(i) of the instantaneous aggregated call quality values X(i) (graph 1150). The smoothed version Xs(i) (graph 1160) may be calculated using exponential smoothing that reduces the abruptness of call quality changes in X(i) from sample index to sample index at block 1008 in FIG. 10. Higher values on the upper y-axis indicate more significant call degradation as determined by a plurality of measurable network conditions.

Graph 1110 may be termed annoyance tolerance referenced as H(X) above which is the tolerance for a user's cumulative annoyance on a call. The annoyance tolerance graph 1110 works in conjunction with the accumulated annoyance graph 1140 to determine a handoff point 1170 at which a user desires the call to handoff from an IP based network to a circuit-switched cellular based network. So long as the smoothed version Xs(i) graph 1160 remains below the threshold level ($C_1$) graph 1130, the call will be considered of sufficient quality and the annoyance tolerance graph 1110 will not dip below its arbitrary setting meaning no handoff will be warranted. Remember, the $C_1$ graph 1130 represents an annoyance tolerance threshold above which users indicate they are annoyed enough to terminate the call whereas $C_0$ (graph 1120) represents an annoyance tolerance threshold above which users indicate they are annoyed but not yet annoyed enough to terminate the call.

The lower solid line graph may be termed the accumulated annoyance graph 1140. The accumulated annoyance A(i) graph 1140 is calculated by summing the instantaneous annoyance(s) for all sample indices (j) within the relevant time window duration (N) at block 920 of FIG. 9. Mathematically, accumulated annoyance for window duration N may be expressed as $A(i)=\Sigma(a(j): j\ in\ S)$, where the set S contains the samples newer than N seconds old. As FIG. 11 indicates, rises in accumulated annoyance as measured by graph 1140 coincide with call degradation values (smoothed Xs graph 1160) above the initial annoyance threshold $C_0$. Drops in the annoyance tolerance graph 1110 coincide with call degradation values (smoothed Xs graph 1160) above the higher annoyance threshold $C_1$ above which users indicate they are annoyed enough to terminate or handoff the call at some point. These boundaries are marked in FIG. 11 by the vertical lines 1105a and 1105b. Vertical line 1105a indicates a point in time at which the instantaneous smoothed call quality (Xs) graph 1160 breaches the $C_1$ annoyance threshold upward causing the annoyance threshold graph 1110 to move lower while vertical line 1105b indicates a point in time at which the instantaneous smoothed call quality (Xs graph 1160) breaches the $C_1$ annoyance threshold downward causing the annoyance threshold graph 1110 to return to the no handoff needed state. A handoff may be initiated when the accumulated annoyance 1140 exceeds the annoyance threshold 1110 at a handoff cutoff point 1170. Mathematically, one could view the accumulated annoyance graph 940 as the integral of the instantaneous aggregated call quality values X(i) graph 1150.

FIG. 12 illustrates an embodiment of a first storage medium. As shown in FIG. 12, the first storage medium includes a storage medium 1200. Storage medium 1200 may comprise an article of manufacture. In some examples, storage medium 1200 may include any non-transitory computer readable medium or machine-readable medium, such as an optical, magnetic or semiconductor storage. Storage medium 1200 may store various types of computer executable instructions, such as instructions to implement one or more of logic flows 800, 900, and/or 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. At least one machine-readable non-transitory medium comprising a set of instructions that in response to being executed on a computing device cause the computing device to:
    obtain IP stream call quality values X1(i) and X2(i) over a sampled time period (N) of (j) samples for an ongoing telephone call over (a) a first IP communication link carrying a first IP stream and (b) a second IP communication link carrying a second IP stream;
    determine call quality values Xb(i) for a combined version of the first and second IP streams;
    store the IP stream call quality values X1(i), X2(i), and Xb(i);
    calculate a first instantaneous annoyance value a1(j), a2(j), and ab(j) for each of the stored call quality values X1(j), X2(j), and Xb(j) within sampled time period (N);
    calculate a first current accumulated annoyance value for each IP stream A1(i), A2(i), and Ab(i) by summing the instantaneous annoyance values a1(j), a2(j), and ab(j);
    initiate a handoff of the telephone call from the IP communication links to a circuit-switched cellular communication link if the accumulated annoyance value for the combined version of the IP streams, Ab(i), is greater than a handoff threshold value for the combined version of the IP streams, Hb(i);
    otherwise
    determine whether A2(i) is greater than a handoff threshold value for the second IP stream, H2(i);
    determine whether the first IP stream over the first IP communication link is predicted to disconnect imminently; and if so initiate a handoff of the telephone call from the combined IP stream communication links to a circuit-switched cellular communication link when the second accumulated annoyance value A2(i) is greater than a second handoff threshold value H2(i).

2. The at least one machine-readable non-transitory medium of claim 1, the IP stream call quality values X1(i), X2(i) and Xb(i) comprise a combination of jitter, latency, dropped packets, link speed, and signal strength.

3. The at least one machine-readable non-transitory medium of claim 1, comprising a first call quality threshold value ($C_0$) wherein call quality values for each IP stream X(j) less than or equal to $C_0$ indicate good call quality such that the first instantaneous annoyance a(j) for that IP stream is zero (0).

4. The at least one machine-readable non-transitory medium of claim 1, comprising a set of instructions that in response to being executed on a computing device cause the computing device to:
 create a first set of smoothed call quality values X1s(i) from the obtained set of first IP stream call quality values X1(i), the first set of smoothed call quality values X1s(i) determined by exponential smoothing that reduces the abruptness of call quality changes from sample index to sample index;
 create a second set of smoothed call quality values X2s(i) from the obtained set of second IP stream call quality values X2(i), the first set of smoothed call quality values X2s(i) determined by exponential smoothing that reduces the abruptness of call quality changes from sample index to sample index; and
 create a combined set of smoothed call quality values Xbs(i) from the obtained set of combined IP stream call quality values Xb(i), the combined set of smoothed call quality values Xbs(i) determined by exponential smoothing that reduces the abruptness of call quality changes from sample index to sample index.

5. The at least one machine-readable non-transitory medium of claim 4, comprising a second call quality threshold value ($C_1$) wherein the smoothed call quality values Xs(i) greater than $C_1$ indicate impaired call quality enough to lower the handoff threshold value H(i).

6. The at least one machine-readable non-transitory medium of claim 1, the first IP communication link carrying the first IP stream comprising an 802.11 WiFi communication link and the second IP communication link carrying the second IP stream comprising a cellular data IP communication link.

7. An apparatus, comprising:
 a processor component;
 communication link handoff (CLH) logic to be executed by the processor component to:
  obtain IP stream call quality values X1(i) and X2(i) over a sampled time period (N) of (j) samples for an ongoing telephone call over (a) a first IP communication link carrying a first IP stream and (b) a second IP communication link carrying a second IP stream;
  determine call quality values Xb(i) for a combined version of the first and second IP streams;
  store the IP stream call quality values X1(i), X2(i), and Xb(i);
  calculate a first instantaneous annoyance value a1(j), a2(j), and ab(j) for each of the stored call quality values X1(j), X2(j), and Xb(j) within sampled time period (N);
  calculate a first current accumulated annoyance value for each IP stream A1(i), A2(i), and Ab(i) by summing the instantaneous annoyance values a1(j), a2(j), and ab(j);
  initiate a handoff of the telephone call from the IP communication links to a circuit-switched cellular communication link if the accumulated annoyance value for the combined version of the IP streams, Ab(i), is greater than a handoff threshold value for the combined version of the IP streams, Hb(i);
  otherwise
  determine whether A2(i) is greater than a handoff threshold value for the second IP stream, H2(i);
  determine whether the first IP stream over the first IP communication link is predicted to disconnect imminently; and if so
  initiate a handoff of the telephone call from the combined IP stream communication links to a circuit-switched cellular communication link when the second accumulated annoyance value A2(i) is greater than a second handoff threshold value H2(i).

8. The apparatus of claim 7, the IP stream call quality values X1(i), X2(i) and Xb(i) comprise a combination of jitter, latency, dropped packets, link speed, and signal strength.

9. The apparatus of claim 7, comprising a first call quality threshold value ($C_0$) wherein call quality values for each IP stream X(j) less than or equal to $C_0$ indicate good call quality such that the first instantaneous annoyance a(j) for that IP stream is zero (0).

10. The apparatus of claim 7, the communication link handoff (CLH) logic to be executed by the processor component to:
 create a first set of smoothed call quality values X1s(i) from the obtained set of first IP stream call quality values X1(i), the first set of smoothed call quality values X1s(i) determined by exponential smoothing that reduces the abruptness of call quality changes from sample index to sample index;
 create a second set of smoothed call quality values X2s(i) from the obtained set of second IP stream call quality values X2(i), the first set of smoothed call quality values X2s(i) determined by exponential smoothing that reduces the abruptness of call quality changes from sample index to sample index; and
 create a combined set of smoothed call quality values Xbs(i) from the obtained set of combined IP stream call quality values Xb(i), the combined set of smoothed call quality values Xbs(i) determined by exponential smoothing that reduces the abruptness of call quality changes from sample index to sample index.

11. The apparatus of claim 10, comprising a second call quality threshold value ($C_1$) wherein the smoothed call quality values Xs(i) greater than $C_1$ indicate impaired call quality enough to lower the handoff threshold value H(i).

12. The apparatus of claim 7, the first IP communication link carrying the first IP stream comprising an 802.11 WiFi communication link and the second IP communication link carrying the second IP stream comprising a cellular data IP communication link.

13. A computer implemented method operative on a processor component, the method comprising:
 obtaining IP stream call quality values X1(i) and X2(i) over a sampled time period (N) of (j) samples for an ongoing telephone call over (a) a first IP communication link carrying a first IP stream and (b) a second IP communication link carrying a second IP stream;

determining call quality values Xb(i) for a combined version of the first and second IP streams;

storing the IP stream call quality values X1(i), X2(i), and Xb(i);

calculating a first instantaneous annoyance value a1(j), a2(j), and ab(j) for each of the stored call quality values X1(j), X2(j), and Xb(j) within sampled time period (N);

calculating a first current accumulated annoyance value for each IP stream A1(i), A2(i), and Ab(i) by summing the instantaneous annoyance values a1(j), a2(j), and ab(j);

initiating a handoff of the telephone call from the IP communication links to a circuit-switched cellular communication link if the accumulated annoyance value for the combined version of the IP streams, Ab(i), is greater than a handoff threshold value for the combined version of the IP streams, Hb(i);

otherwise determining whether A2(i) is greater than a handoff threshold value for the second IP stream, H2(i);

determining whether the first IP stream over the first IP communication link is predicted to disconnect imminently; and if so initiating a handoff of the telephone call from the combined IP stream communication links to a circuit-switched cellular communication link when the second accumulated annoyance value A2(i) is greater than a second handoff threshold value H2(i).

14. The computer implemented method of claim 13, the IP stream call quality values X1(i), X2(i) and Xb(i) comprising a combination of jitter, latency, dropped packets, link speed, and signal strength.

15. The computer implemented method of claim 13, comprising a first call quality threshold value ($C_0$) wherein call quality values for each IP stream X(j) less than or equal to $C_0$ indicate good call quality such that the first instantaneous annoyance a(j) for that IP stream is zero (0).

16. The computer implemented method of claim 13, comprising a set of instructions that in response to being executed on a computing device cause the computing device to:

create a first set of smoothed call quality values X1s(i) from the obtained set of first IP stream call quality values X1(i), the first set of smoothed call quality values X1s(i) determined by exponential smoothing that reduces the abruptness of call quality changes from sample index to sample index;

create a second set of smoothed call quality values X2s(i) from the obtained set of second IP stream call quality values X2(i), the first set of smoothed call quality values X2s(i) determined by exponential smoothing that reduces the abruptness of call quality changes from sample index to sample index; and create a combined set of smoothed call quality values Xbs(i) from the obtained set of combined IP stream call quality values Xb(i), the combined set of smoothed call quality values Xbs(i) determined by exponential smoothing that reduces the abruptness of call quality changes from sample index to sample index.

17. The computer implemented method of claim 16, comprising a second call quality threshold value ($C_1$) wherein the smoothed call quality values Xs(i) greater than $C_1$ indicate impaired call quality enough to lower the handoff threshold value H(i).

18. The computer implemented method of claim 13, the first IP communication link carrying the first IP stream comprising an 802.11 WiFi communication link and the second IP communication link carrying the second IP stream comprising a cellular data IP communication link.

* * * * *